United States Patent
Shinagawa

(10) Patent No.: US 9,097,175 B2
(45) Date of Patent: Aug. 4, 2015

(54) INTERNAL COMBUSTION ENGINE WITH SUPERCHARGER

(75) Inventor: Tomohiro Shinagawa, Sunto-gun (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 13/504,069

(22) PCT Filed: Apr. 8, 2011

(86) PCT No.: PCT/JP2011/058901
§ 371 (c)(1),
(2), (4) Date: Apr. 25, 2012

(87) PCT Pub. No.: WO2012/137345
PCT Pub. Date: Oct. 11, 2012

(65) Prior Publication Data
US 2014/0026559 A1   Jan. 30, 2014

(51) Int. Cl.
*F02D 23/00* (2006.01)
*F02D 17/04* (2006.01)
(Continued)

(52) U.S. Cl.
CPC ............... *F02B 37/12* (2013.01); *F02B 37/18* (2013.01); *F02D 41/0007* (2013.01); *F02D 41/042* (2013.01); *F02D 41/065* (2013.01); *F02N11/0844* (2013.01); *F02B 2037/125* (2013.01); *F02D 2200/021* (2013.01); *F02D 2200/101* (2013.01); *F02N 99/006* (2013.01); *F02N 2200/022* (2013.01); *Y02T 10/144* (2013.01); *Y02T 10/48* (2013.01)

(58) Field of Classification Search
CPC .... F02B 37/12; F02B 37/18; F02B 2037/125; F02D 41/0007; F02D 41/042; F02D 2200/101; F02N 11/0844; F02N 2200/022; F02N 99/006; Y02T 10/144; Y02T 10/48

USPC ........... 60/602–603; 701/103–104, 112, 114; 123/179.3, 179.4, 179.13, 198 DB, 123/198 F, 299, 332–333
See application file for complete search history.

(56) References Cited

U.S. PATENT DOCUMENTS 5,622,053 A * 4/1997 Freen ............................ 123/299
5,791,145 A * 8/1998 Freen ............................ 123/299
(Continued)

FOREIGN PATENT DOCUMENTS

DE   102006043678 A1   3/2008
EP      990793 A2 *   4/2000   .............. F02N 11/08
(Continued)

OTHER PUBLICATIONS

International Search Report & Written Opinion mailed Jul. 12, 2011 of PCT/JP2011/058901.

*Primary Examiner* — Thai Ba Trieu
(74) *Attorney, Agent, or Firm* — Kenyon & Kenyon LLP

(57) ABSTRACT

The internal combustion engine includes a turbocharger and a waste-gate valve. When the operation resumption request is generated while the internal combustion engine is stopped due to automatic stop control, the waste-gate valve fully opens as far as the engine speed is not lower than a predetermined revolution speed. Further, self-recovery control is executed over the internal combustion engine (or more specifically, a fuel injection and ignition operation is resumed). Meanwhile, in a case where the engine speed is lower than the predetermined revolution speed when the operation resumption request is generated, the waste-gate valve fully closes. Subsequently, stop control, which has already been initiated, is continuously executed to bring the internal combustion engine to a complete stop. The waste-gate valve reverts to an open position in preparation for the restart of the internal combustion engine.

5 Claims, 2 Drawing Sheets

(51) Int. Cl.
 *F02B 3/00* (2006.01)
 *G06F 17/00* (2006.01)
 *G06F 19/00* (2011.01)
 *F02B 37/12* (2006.01)
 *F02B 37/18* (2006.01)
 *F02D 41/04* (2006.01)
 *F02N 11/08* (2006.01)
 *F02D 41/00* (2006.01)
 *F02D 41/06* (2006.01)
 *F02N 99/00* (2010.01)

(56) References Cited

U.S. PATENT DOCUMENTS

| | | | |
|---|---|---|---|
| 6,363,906 B1 * | 4/2002 | Thompson et al. | 123/198 DB |
| 6,504,259 B1 * | 1/2003 | Kuroda et al. | 290/40 C |
| 6,595,180 B2 * | 7/2003 | Thompson et al. | 123/198 DB |
| 6,823,827 B2 * | 11/2004 | Sugiura et al. | 123/179.4 |
| 6,839,621 B2 * | 1/2005 | Kaneko | 701/112 |
| 8,408,180 B2 * | 4/2013 | Nagoshi et al. | 60/602 |

FOREIGN PATENT DOCUMENTS

| | | | | |
|---|---|---|---|---|
| JP | 60252123 A | * | 12/1985 | F02B 37/12 |
| JP | 11278091 A | * | 10/1999 | F02N 11/08 |
| JP | 11324755 A | * | 11/1999 | F02D 17/00 |
| JP | 2000110597 A | * | 4/2000 | F02D 17/00 |
| JP | 2003-065104 A | | 3/2003 | |
| JP | 2006-183629 A | | 7/2006 | |
| JP | 2009-174493 A | | 8/2009 | |
| JP | 2009-197738 A | | 9/2009 | |
| JP | 2010-127213 A | | 6/2010 | |

* cited by examiner

INTERNAL COMBUSTION ENGINE WITH SUPERCHARGER

CROSS REFERENCE TO RELATED APPLICATIONS

This is a 371 national phase application of PCT/JP2011/058901 filed 8 Apr. 2011, the contents of which are incorporated herein by reference.

TECHNICAL FIELD

The present invention relates to an internal combustion engine with a supercharger.

BACKGROUND ART

A known control device for an internal combustion engine that is disclosed, for instance, in Patent document 1 is capable of exercising engine automatic stop/restart control configured to perform its functions of automatically stopping/restarting the internal combustion engine so as to bring the internal combustion engine to an automatic stop when predefined automatic stop conditions are met and restart the automatically stopped internal combustion engine when predefined restart conditions are met.

The internal combustion engine to which the above conventional technology is applied includes not only a turbocharger but also an exhaust bypass path and waste-gate valve that provide boost pressure adjustment. The waste-gate valve is controlled by an engine control unit. When the automatic stop conditions are met to stop the internal combustion engine in the above-described configuration, the waste-gate valve fully opens to open the exhaust bypass path. As a result, the amount of exhaust gas introduced into the exhaust bypass path increases and the amount of exhaust gas supplied to a turbine of the turbocharger decreases. This reduces the exhaust resistance in an engine stop process, thereby scavenging each cylinder with increased efficiency.

PRIOR ART LITERATURE

Patent Documents

Patent Document 1: JP-A-2009-197738
Patent Document 2: JP-A-2003-65104

SUMMARY OF THE INVENTION

Technical Problem

The above-described conventional technology is designed to reduce the exhaust resistance in the internal combustion engine stop process by executing control to fully open the waste-gate valve when the internal combustion engine is brought to an automatic stop. In this manner, the conventional technology scavenges each cylinder with increased efficiency, thereby providing improved restartability after an engine stop. Meanwhile, an operation resumption request for resuming the operation of the internal combustion engine may be generated while automatic stop control is executed over the internal combustion engine. If internal combustion engine stop/restart control is uniformly executed when there is the operation resumption request, the time required for responding to the request inevitably increases. Even though the conventional technology provides improved scavenging at the time of engine stop and improves the restartability after an engine stop, there is a limit on the degree of shortening of a series of control operations for internal combustion engine stop and restart. It is preferred that the generation of the operation resumption request be anticipated and answered without undue delay. In this respect, the conventional technology merely provides optimized waste-gate valve control with a view toward internal combustion engine stop and restart and does not intend to handle the operation resumption request. In other words, the conventional technology still needs to be improved so that waste-gate valve control during an internal combustion engine stop period will be executed with a view toward handling a request for internal combustion engine operation resumption.

The present invention has been made to solve the above-described problem. An object of the present invention is to provide an internal combustion engine with a supercharger and capable of handling an operation resumption request during an internal combustion engine stop period in a situation where waste-gate valve control is executed in consideration of pumping loss at the time of internal combustion engine stop.

Solution to Problem

To achieve the above-mentioned purpose, a first aspect of the present invention is an internal combustion engine comprising:
a supercharger;
a waste-gate valve provided with the supercharger; and
a controller controlling the waste-gate valve and having a control logic configured to, when executed:
  (i) execute automatic stop control to bring the internal combustion engine to an automatic stop when predefined conditions are established during an operation of the internal combustion engine;
  (ii) control to place the waste-gate valve in an open position with a view toward decreasing a pumping loss of the internal combustion engine, in a case where a revolution speed of the internal combustion engine is equal to or higher than a self-recovery revolution speed at which the operation of the internal combustion engine is recovered by the resumption of fuel injection control without requiring auxiliary motive power generated when an operation resumption request concerning the internal combustion engine is generated in the middle of a stop period provided by the automatic stop control; and
  (iii) control to place the waste-gate valve in a closed position with a view toward increasing the pumping loss of the internal combustion engine, in a case where the revolution speed of the internal combustion engine is lower than the self-recovery revolution speed when the operation resumption request concerning the internal combustion engine is generated in the middle of the stop period provided by the automatic stop control.

A second aspect of the present invention is the internal combustion engine according to the first aspect, wherein the controller further having a control logic configured to, when executed, control to place the waste-gate valve in the open position, the waste-gate valve having been previously placed in the closed position, when the internal combustion engine is to restart after the stop thereof.

A third aspect of the present invention is the internal combustion engine according to the first or the second aspects, wherein:
the waste-gate valve includes an actuator for opening and closing the waste-gate valve; and the controller controls the actuator to fully open the waste-gate valve in the case where the revolution speed of the internal combustion engine is equal to or higher than the self-recovery revolution speed, and controls the actuator to fully close the waste-gate valve in the case where the revolution speed of the internal combustion engine is lower than the self-recovery revolution speed.

A fourth aspect of the present invention is the internal combustion engine according to any one of the first to third aspects, further comprising:

detection means for detecting a water temperature of the internal combustion engine; wherein the controller including a memory storing self-recovery revolution speed characteristics which constitute information defining the self-recover revolution seed with resect to the water temperature of the internal combustion engine; the controller having a control logic configured to, when executed, acquiring the self-recovery revolution speed based on the engine water temperature detected by the detection means, in accordance with the self-recovery revolution speed characteristics stored in the memory.

A fifth aspect of the present invention is the internal combustion engine according to any one of the first to fourth aspects, wherein the controller further having a control logic configured to, when executed: (i) compare the revolution seed of the internal combustion engine against the self-recovery revolution speed, and determine whether or not the operation resumption request concerning the internal combustion engine is generated, periodically; and (ii) terminate the periodic determination whether or not the operation resumption request is generated when the revolution speed of the internal combustion engine is found by the comparison to be lower than the self-recovery speed.

Advantages of the Invention

According to the first aspect of the present invention, the status (open or closed) of the waste-gate valve can be controlled depending on whether self-recovery is achievable when an internal combustion engine operation resumption request is generated during an automatic stop period. Therefore, when self-recovery is achievable, the recovery of an operation can be facilitated by reducing the pumping loss. When, on the other hand, self-recovery is unachievable, the internal combustion engine can be promptly stopped by increasing the pumping loss.

According to the second aspect of the present invention, restartability can be improved to reduce startup time. Therefore, an operation resumption request can be promptly answered.

According to the third aspect of the present invention, the actuator can drive the waste-gate valve without regard to the magnitude of boost pressure. Therefore when the pumping loss is to be increased or decreased, the waste-gate valve can be fully opened or fully closed.

According to the fourth aspect of the present invention, the self-recovery revolution speed can be adjusted in accordance with internal combustion engine water temperature. This makes it possible to accurately judge whether self-recovery is achievable from the viewpoint of engine water temperature. Consequently, an opportunity of control can be acquired to let the internal combustion engine achieve self-recovery.

According to the fifth aspect of the present invention, an opportunity of exercising control can be acquired wherever possible to let the internal combustion engine achieve self-recovery while self-recovery is achievable.

Figure 1:
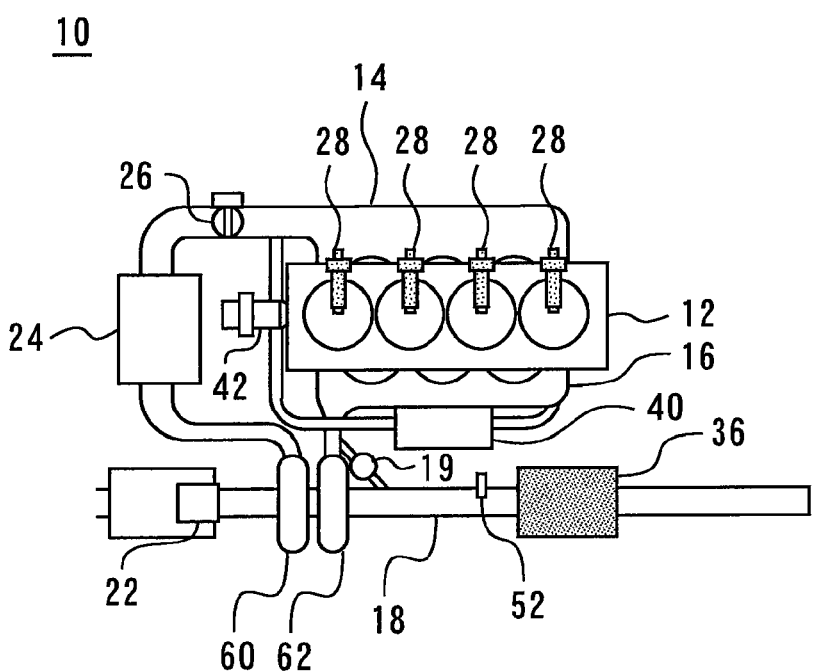
FIG. 1 is a diagram illustrating the configuration of a control device for an internal combustion engine with a supercharger according to an embodiment of the present invention.
Figure 1:
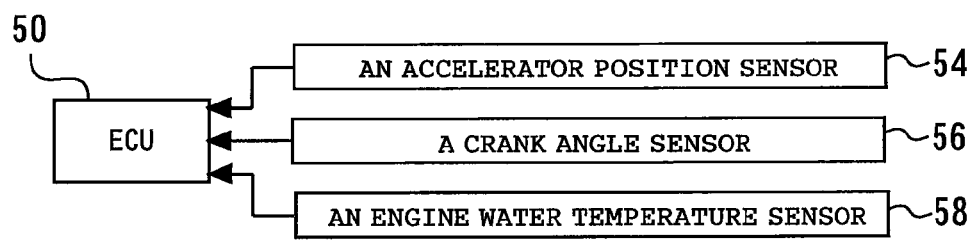

REFERENCE SIGNS LIST 10 an internal combustion engine
12 a cylinder block
14 an intake manifold
16 an exhaust manifold
18 an exhaust pipe line
19 a waste-gate valve
22 an air flow meter
24 an inter-cooler
26 a throttle
28 a fuel injection valve
36 a catalyst
40 an EGR cooler
42 an EGR valve
50 ECU
52 an exhaust gas sensor
54 an accelerator position sensor
56 a crank angle sensor
58 an engine water temperature sensor
60 a compressor
62 a turbine

MODE FOR CARRYING OUT THE INVENTION

Description of Embodiment

Configuration of Embodiment (Basic Configuration of Internal Combustion Engine According to Embodiment)

FIG. 1 is a diagram illustrating the configuration of a control device for an internal combustion engine with a supercharger according to an embodiment of the present invention. FIG. 1 shows the configuration of the internal combustion engine 10 with a supercharger to which the control device for an internal combustion engine with a supercharger according to the present embodiment is applied. In the present embodiment, the internal combustion engine 10 includes a turbocharger as a supercharger and is suitably used as an internal combustion engine that generates motive power for a vehicle or other movable body. The turbocharger includes a compressor 60, which is disposed in an intake path, and a turbine 62, which is disposed in an exhaust path.

The internal combustion engine 10 according to the present embodiment includes a cylinder block 12. In the present embodiment, the internal combustion engine 10 is, for example, a gasoline engine in which a cylinder block 12 includes four serially arranged cylinders. An intake port for each cylinder in the cylinder block 12 is connected to an intake manifold 14. A throttle 26, an inter-cooler 24, a compressor 60 for the turbocharger, and an air flow meter 22 are sequentially disposed toward upstream of the intake manifold 14. Fresh air is taken in from the air flow meter 22 side so that air is supplied to each cylinder in the cylinder block 12 through the intake manifold 14.

The cylinder block 12 of the internal combustion engine 10 includes a fuel injection valve 28. The fuel injection valve 28 is provided for each cylinder in the cylinder block 12. The fuel injection valve 28 operates so that fuel acquired from a fuel tank (not shown) is injected into each cylinder. In the present embodiment, an in-cylinder direct-injection injector is employed as the fuel injection valve 28. Each cylinder in the cylinder block 12 is provided with an intake valve (not shown), an exhaust valve (not shown), and an ignition plug (not shown). A cylinder head (not shown), which is integral with the cylinder block 12, has a built-in valve train that drives the intake valve and exhaust valve.

An exhaust port of each cylinder in the cylinder block 12 is connected to an exhaust manifold 16. The downstream end of the exhaust manifold 16 is connected to an exhaust pipe line 18 via the turbine 62. A catalyst 36 is disposed in the exhaust pipe line 18. The exhaust pipe line 18 also includes an exhaust gas sensor 52. The exhaust gas sensor 52 is an air-fuel ratio sensor or other similar sensor that is capable of detecting the composition of exhaust gas.

The turbocharger according to the present embodiment includes a waste-gate valve 19. The waste-gate valve 19 adjusts the boost pressure of the turbocharger. The valve opening pressure for the waste-gate valve 19 is not predetermined. The waste-gate valve 19 is capable of opening and closing at arbitrary timing. More specifically, the waste-gate valve 19 is a valve mechanism that includes an electrically-driven valve, a vacuum-pump-operated negative-pressure-adjustment valve, or other external actuator that can be driven to open and close.

The internal combustion engine 10 according to the present embodiment includes an EGR system that provides EGR. As shown in FIG. 1, the exhaust manifold 16 is connected to the intake manifold 14 through an EGR cooler 40 and an EGR valve 42. Exhaust gas can be circulated through these mechanisms.

The present embodiment includes an ECU (electronic control unit) 50. The ECU 50 is connected to the air flow meter 22, the exhaust gas sensor 52, an accelerator position sensor 54, a crank angle sensor 56, and an engine water temperature sensor 58. The accelerator position sensor 54, the crank angle sensor 56, and the engine water temperature sensor 58 are shown in the block diagram of FIG. 1. In reality, however, these sensors are disposed as appropriate to sense their detection targets. More specifically, the accelerator position sensor 54 is disposed near an accelerator pedal; the crank angle sensor 56 is disposed near a crankshaft; and the engine water temperature sensor 58 is disposed in an engine cooling water path. The ECU 50 is also connected to the throttle 26, the fuel injection valve 28, and various actuators (e.g., various actuators in a variable valve timing mechanism (not shown) capable of changing the valve opening characteristics of the intake valve and exhaust valve) and sensors (e.g., intake pressure sensor and in-cylinder pressure sensor) for the internal combustion engine 10.

In accordance with the output values of the above-mentioned sensors, the ECU 50 detects, for instance, an engine speed, an air flow, an accelerator pedal operation amount, and a value detected by the exhaust gas sensor. Further, the ECU 50 functions as an engine controller that provides publicly known engine control such as the control of a fuel injection amount, ignition timing, and air-fuel ratio. The ECU 50 connects to the waste-gate valve 19 and issues a control signal for opening or closing the waste-gate valve 19 as needed, for instance, for boost pressure regulation.

(Eco-Run System According to Embodiment)

The ECU 50 includes an eco-run controller that operates the internal combustion engine 10 in an eco-run mode. The eco-run controller stores a control program for implementing an eco-run system for the internal combustion engine 10.

An economy running (may be hereinafter referred to as "eco-run") function and an automatic stop idling scheme (hereinafter simply referred to as the "eco-run system"), which automatically stop the internal combustion engine when the vehicle stops, are known. It is expected that various effects will be produced to reduce a fuel consumption amount and achieve higher fuel efficiency or reduce $CO_2$ emissions if the internal combustion engine automatically stops when the revolution speed of the vehicle is reduced to zero due, for instance, to a red traffic light. When predefined automatic stop conditions (eco-run mode conditions) are met, the eco-run system automatically stops the engine. Whether the eco-run mode conditions are met can be determined, for instance, by checking whether the accelerator pedal is depressed, measuring the amount of remaining battery power, checking whether a brake pedal is depressed, and measuring the cooling water temperature.

In the present embodiment, the ECU 50 stores the control program concerning the above-described eco-run system and operates in accordance with the control program. When the predefined eco-run mode conditions are met, the ECU 50 can execute automatic stop control over the internal combustion engine.

The eco-run controller in the ECU 50 generates an eco-run permission signal, which permits an eco-run, and an eco-run inhibition signal, which inhibits an eco-run. In a state where the eco-run permission signal is received, the engine controller in the ECU 50 automatically stops the internal combustion engine when the automatic stop conditions for the internal combustion engine 10 are met, and restarts the internal combustion engine 10 when restart conditions for the internal combustion engine 10 are met. The present embodiment is described on the assumption that one ECU (ECU 50) includes the eco-run controller and the engine controller. However, the present invention is not limited to such a configuration. The present invention may employ a configuration in which an eco-run ECU and an engine ECU are separately prepared. Each of the eco-run ECU and engine ECU may be a computer-based independent ECU that includes, for instance, a CPU, memories such as a RAM and a ROM, and an input/output interface.

The ECU 50 stores a judgment process concerning the predefined automatic stop conditions for eco-run mode operations and a judgment process concerning the predefined restart conditions for the eco-run mode operations.

First of all, the judgment concerning the automatic stop conditions can be formulated, for instance, by checking whether the revolution speed of the vehicle is reduced to zero, the brake pedal is depressed, the accelerator pedal is not depressed, the water temperature is within a predefined range, the amount of remaining battery power is not smaller than a reference charge amount, the eco-run permission signal is generated, and various other conditions are met. In the present embodiment, it is assumed that some or all of the above conditions are selected to predefine the automatic stop conditions. The ECU 50 can perform the judgment process that judges whether the automatic stop conditions are met.

The judgment concerning the restart conditions can be formulated, for instance, by checking whether any of the above automatic start conditions is not met. Vehicle speed information detected by a vehicle speed sensor, a signal detected by a brake pedal stroke sensor, accelerator opening information detected by the accelerator position sensor 54, water temperature information detected by a water temperature sensor, and other relevant information are input into the ECU 50 to let the ECU 50 judge whether the automatic start conditions and restart conditions are met.

When the vehicle is stopped due, for instance, to a red traffic light in a state where the eco-run permission signal is received, the ECU 50 judges whether the automatic stop conditions are established. When the automatic stop conditions are judged to be established, process for stopping the internal combustion engine 10 (stop control) starts. The internal combustion engine 10 stops rotating by immediately stopping, for instance, the injection of fuel from the fuel injection valve and an ignition control operation for the ignition plug.

Meanwhile, when the restart conditions are established after the internal combustion engine 10 is brought to an automatic stop or while an automatic stop process is being performed on the internal combustion engine 10, the ECU 50 restarts the internal combustion engine 10. More specifically, when the restart conditions are judged to be established, the ECU 50 performs a control process to supply electrical power from a battery and rotationally drives a starter motor and other motors (not shown), thereby cranking the internal combustion engine 10. When the engine speed reaches a predetermined value due to cranking, the ECU 50 performs a control process of fuel injection control and ignition timing control in accordance, for instance, with a crank position and a cam position, thereby driving the internal combustion engine 10 into an operating state.

[Operation of Embodiment]

According to the above-described eco-run system, it is expected that various effects will be produced to reduce the fuel consumption amount and achieve higher fuel efficiency or reduce $CO_2$ emissions as far as the internal combustion engine 10 automatically stops when the predefined conditions are established. It should be noted, however, that an operation resumption request for resuming the operation of the internal combustion engine may be generated while automatic stop control is exercised executed over the internal combustion engine 10. One typical example of operation resumption request is a COM (change of mind), which is a request that should not be ignored by the eco-run system. The COM is generated in a case where a driver increases an accelerator opening to make a request for re-acceleration when the eco-run system attempts to stop the internal combustion engine.

In a case where the above-mentioned COM is generated when an attempt is made to stop the internal combustion engine, whether recovery and re-acceleration can be achieved is determined by the degree of an engine speed decrease during a stop control process. For example, when the engine speed is within the range of 200 rpm to 600 rpm in a situation where an idle speed is approximately 600 rpm, the operation of the internal combustion engine can be recovered by resuming a fuel injection operation during a stop control period, that is, by performing only a fuel injection and ignition operation (without requiring auxiliary motive power generated, for instance, by a motor). However, when the engine speed is lower than a certain value, engine torque derived from in-cylinder combustion is inferior to engine friction. To resume the operation of the internal combustion engine in this situation, it is necessary to stop the engine and then let a starter to provide assistance. In this instance, an unavoidable lag occurs between the instant at which the driver makes a request for re-acceleration and the instant at which the internal combustion engine actually starts and accelerates. As a result, a request for acceleration is answered with a significant delay.

Therefore, when the driver generates an acceleration request (when there is an increase in the accelerator opening detected by the accelerator position sensor 54) after stop control is initiated for the internal combustion engine, the control device for an internal combustion engine with a supercharger according to the present embodiment causes the ECU 50 to perform a process for implementing a control operation described under (1) or (2) below in accordance with the revolution speed of the internal combustion engine 10. It is assumed that the information about the revolution speed of the internal combustion engine 10, which is used for the following control operations, is detected in accordance with the output of the crank angle sensor 56.

(1) When the engine speed is not lower than a predetermined value, the waste-gate valve 19 fully opens. Further, self-recovery control is executed over the internal combustion engine 10 to resume a fuel injection and ignition operation.

In the present embodiment, a "self-recovery revolution speed" is set as the predetermined engine speed. The "self-recovery revolution speed" is a revolution speed at which the operation can be recovered by the resumption of fuel injection control. More specifically, in the present embodiment, the self-recovery revolution speed is a revolution speed at which the operation of the internal combustion engine 10 can be recovered by allowing the fuel injection valve 28 to resume a fuel injection operation and executing ignition timing control during a stop period provided by automatic stop control executed by the eco-run system, that is, by performing only a fuel injection and ignition operation (without requiring auxiliary motive power generated, for instance, by a motor). Further, in the present embodiment, the setting for the self-recovery revolution speed varies with the engine water temperature and is stored in the ECU 50 in the form, for instance, of a map. When the engine speed is to be compared against the self-recovery revolution speed, the value of the self-recovery revolution speed appropriate for the engine water temperature is identified from the map or the like.

When the waste-gate valve 19 fully opens, the pumping loss can be minimized wherever possible. As a result, self-recovery can be facilitated.

(2) When the engine speed is lower than the predetermined value, the waste-gate valve 19 fully closes. Subsequently, already initiated stop control is continuously executed to bring the internal combustion engine 10 to a complete stop. As with case (1) above, the self-recovery revolution speed is set as the predetermined engine speed.

When the waste-gate valve 19 fully closes, air can be supplied to the turbine 62 for the turbocharger to increase the pumping loss. This makes it possible to stop the internal combustion engine 10 with ease and reduce the time required for the engine to stop. As a result, the aforementioned lag decreases.

In the present embodiment, the waste-gate valve 19 reverts to an open position in preparation for the restart of the internal combustion engine 10. This reduces the pumping loss when the internal combustion engine 10 restarts.

As described above, when an operation resumption request is generated for the internal combustion engine 10 during the automatic stop process, the control device for an internal combustion engine with a supercharger according to the present embodiment can control the status (open or closed) of the waste-gate valve 19 depending on whether self-recovery is achievable. Therefore, when self-recovery is achievable, the pumping loss can be decreased to recover the operation with ease. When, on the other hand, self-recovery is unachievable, the pumping loss can be increased to promptly stop the internal combustion engine.

Further, in the present embodiment, the waste-gate valve 19 is capable of opening and closing at arbitrary timing as mentioned earlier. Therefore, control operation (1) or (2) above can be selectively performed as needed without regard to the boost pressure.

Details of Process Performed in Embodiment

Figure 2:
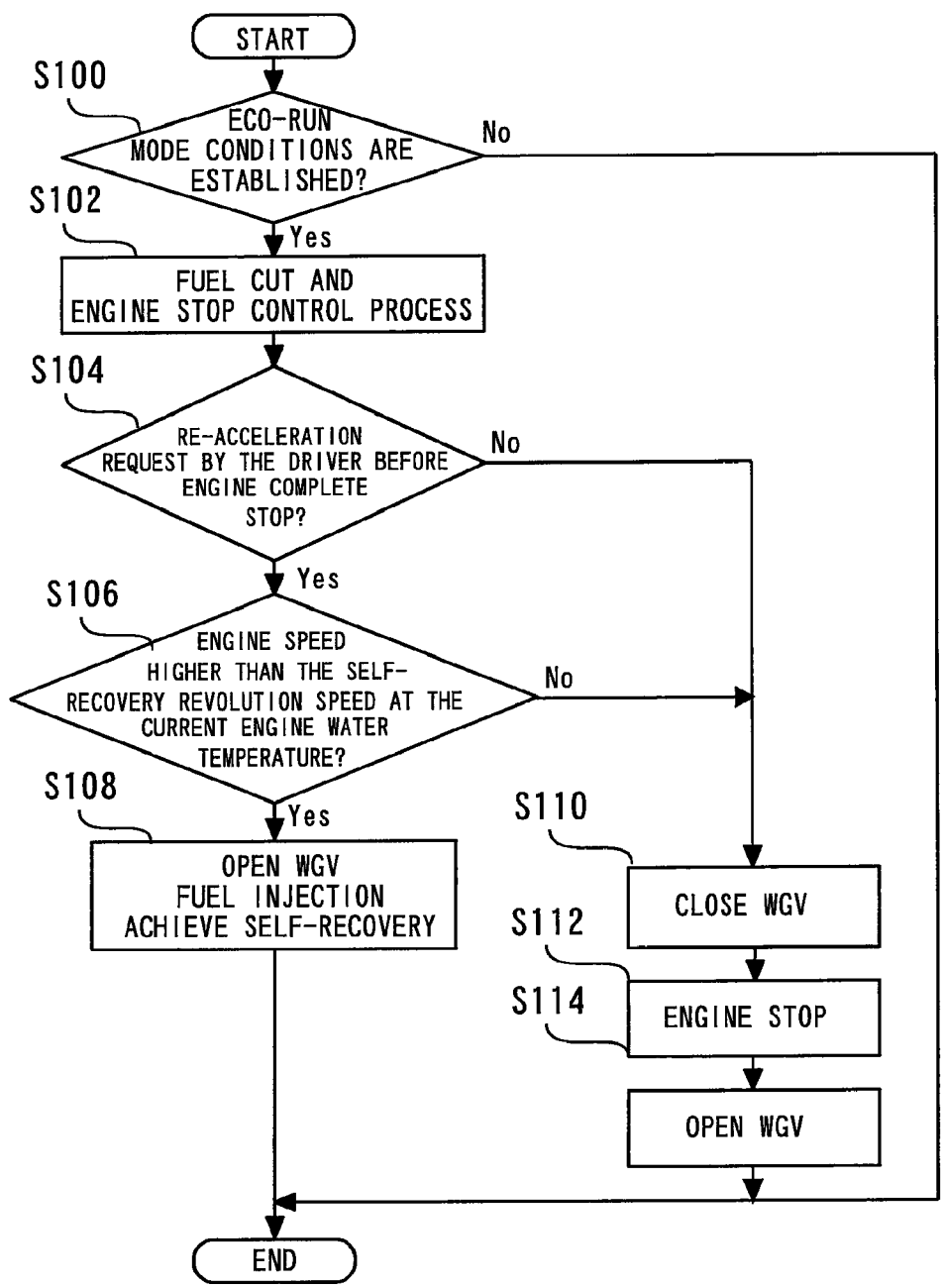
FIG. 2 is a flowchart illustrating a routine that is executed by the ECU in the control device for an internal combustion engine with a supercharger according to the present embodiment.

FIG. 2 is a flowchart illustrating a routine that is executed by the ECU 50 in the control device for an internal combustion engine with a supercharger according to the present embodiment. The routine shown in FIG. 2 is executed while the internal combustion engine 10 operates. In FIG. 2, the waste-gate valve is abbreviated to "WGV."

The routine shown in FIG. 2 first causes the ECU 50 to perform a judgment process for the purpose of judging whether the eco-run mode conditions are established (step S100). When the conditions are not found to be established in step S100, the routine terminates. When, on the other hand, the conditions are found to be established in step S100 (the query in step S100 is answered "YES"), the ECU 50 starts operating the internal combustion engine 10 in the eco-run mode, which is provided by the eco-run system.

When the automatic stop conditions are established while an eco-run mode operation is being performed after the conditions were found to be established in step S100, the ECU 50 performs a fuel cut and engine stop control process (step S102).

Next, the ECU 50 performs a judgment process to judge whether a re-acceleration request is generated by the driver before the engine is brought to a complete stop (step S104). In step S104, the ECU 50 detects an accelerator operation performed by the driver in accordance with the output of the accelerator position sensor 54 and judges whether the re-acceleration request is generated. In this step, a COM can be detected.

When the conditions are found to be established in step S104 (the query in step S104 is answered "YES"), the ECU 50 proceeds to step S106 and judges whether the engine speed is higher than the self-recovery revolution speed at the current engine water temperature.

The self-recovery revolution speed is defined as appropriate in the form of a constant, a map, a mathematical expression, or the like in accordance, for instance, with the results of experiments, and stored in a RAM, a ROM, or other memory in the ECU 50 so that it can be referenced. The map, mathematical expression, or the like is used to define the relationship between the engine water temperature and the self-recovery revolution speed. The map, mathematical expression, or the like is the information that defines the value of the self-recovery revolution speed in accordance with the water temperature of the internal combustion engine. This information is also referred to as the "self-recovery revolution speed characteristics." In the present embodiment, it is assumed that the map is stored as the self-recovery revolution speed characteristics. In step S106, the ECU 50 accesses the map and reads the self-recovery revolution speed at the current engine water temperature that is detected in accordance, for instance, with the output value of the engine water temperature sensor. The read self-recovery revolution speed is compared against the current engine speed in the judgment process performed in step S106. The self-recovery revolution speed may alternatively be calculated in the form of a model from compression ratio, cam timing, or the like.

According to step S106, the self-recovery revolution speed can be adjusted in accordance with the water temperature of the internal combustion engine 10. This makes it possible to accurately judge, from the viewpoint of engine water temperature, whether self-recovery is achievable, and acquire an opportunity of control to let the internal combustion engine 10 achieve self-recovery.

After completion of step S106, the ECU 50 proceeds to step S108 and performs a process for opening the waste-gate valve 9. This makes it possible to reduce the pumping loss. Further, the ECU 50 causes the fuel injection valve 28 to resume a fuel injection and ignition operation and executes control to achieve self-recovery of revolution. This ensures that the re-acceleration request generated in step S104 can be immediately answered. Upon completion of step S108, the routine terminates.

When, on the other hand, the conditions are not found to be established in step S104 (the query in step S104 is answered "NO"), the ECU 50 proceeds to step S110 and performs a process for fully closing the waste-gate valve 19. This increases the pumping loss to shorten an engine stop period.

Next, the ECU 50 proceeds to step S112 and performs a process for engine stop control that was already initiated in step S102.

After step S112 is completed to stop the internal combustion engine 10, the ECU 50 proceeds to step S114 and performs a process for opening the waste-gate valve 19. Upon completion of step S114, the routine terminates. Subsequently, another routine (not shown) causes the ECU 50 to restart the internal combustion engine 10, as is the case with the restart provided by the eco-run system. More specifically, in the same manner as in the process performed by the eco-run system when the restart conditions are found to be established, the ECU 50 performs a control process to supply electrical power from the battery and rotationally drive the starter motor and other motors, thereby cranking the internal combustion engine 10. When the engine speed reaches a predetermined value due to cranking, the ECU 50 performs a control process to execute fuel injection control and ignition timing control in accordance, for instance, with a crank position and a cam position, thereby driving the internal combustion engine 10 into an operating state.

When control is executed in step S114 to open the waste-gate valve 19, the pumping loss can be reduced while restart control is executed over the internal combustion engine 10. As a result, restartability can be improved to reduce startup time. Hence, the re-acceleration request in step S104 can be answered as quickly as possible.

When an operation resumption request (re-acceleration request) for the internal combustion engine 10 is generated during an automatic stop period, the above-described process makes it possible to judge, in accordance with the self-recovery revolution speed appropriate for the current engine water temperature, whether self-recovery is achievable. In accordance with the result of judging whether self-recovery is achievable, it is possible to determine whether the waste-gate valve 19 should be fully open or fully closed. Therefore, when self-recovery is achievable, the pumping loss can be decreased to facilitate the recovery of an operation. When, on the other hand, self-recovery is unachievable, the pumping loss can be increased to promptly stop the internal combustion engine. Further, when the internal combustion engine restarts later, improved restartability is provided to reduce startup time. As described above, when the process according to the present embodiment is performed, the driver's re-acceleration request can be answered as quickly as possible even after automatic stop control is initiated in the eco-run mode.

The flowchart of FIG. 2, which depicts the foregoing embodiment, illustrates the routine that proceeds to step S106 after performing step S104 once. However, the present invention is not limited to such a routine. The judgment process for determining whether the re-acceleration request is generated may be repeated at predetermined intervals until the engine speed drops below the "self-recovery revolution speed for the current engine water temperature" (that is, as far as the engine speed is not lower than the self-recovery revolution speed).

For example, the following alternative procedure may be performed. First of all, as far as the conditions in step S106 are established (the query in step S106 is answered "YES"), steps S104 and S106 are repeatedly performed in parallel with each other. If the conditions in step S104 are established while the conditions in step S106 are established (the query in step S106 is answered "YES"), the routine proceeds to step S108. Meanwhile, if the conditions in step S106 are not established (the query in step S106 is answered "NO"), the routine stops performing step S104 and proceeds to steps S110 and beyond.

When the above alternative procedure is performed, it is possible to acquire an opportunity of control to let the internal combustion engine 10 achieve self-recovery wherever possible while it is achievable.

The present invention is not limited to the hardware configuration shown in FIG. 1, which was described in connection with the foregoing embodiment. The present invention can be applied not only to the in-line four-cylinder gasoline engine described in connection with the foregoing embodiment, but also to various internal combustion engines with a supercharger irrespective of the number of cylinders and the type of engine. Further, the present invention is also applicable to an internal combustion engine without an external EGR system. In the foregoing embodiment, it is assumed that an in-cylinder direct-injection injector is employed as the fuel injection valve 28. However, the present invention is also applicable to a configuration that includes a port-injection injector as the fuel injection valve or includes both the in-cylinder direct-injection injector and the port-injection injector.

The invention claimed is:

1. An internal combustion engine comprising:
a supercharger;
a waste-gate valve provided with the supercharger; and
a controller for controlling the waste-gate valve, said controller including a control logic to execute instructions from a non-transitory machine-readable storage medium to:
  (i) execute automatic stop control to bring the internal combustion engine to an automatic stop when predefined conditions are established during an operation of the internal combustion engine;
  (ii) control to place the waste-gate valve in an open position with a view toward decreasing a pumping loss of the internal combustion engine, in a case where a revolution speed of the internal combustion engine is equal to or higher than a self-recovery revolution speed at which the operation of the internal combustion engine is recovered by a resumption of fuel injection control without requiring auxiliary motive power generated when an operation resumption request concerning the internal combustion engine is generated in the middle of a stop period provided by the automatic stop control; and
  (iii) control to place the waste-gate valve in a closed position with a view toward increasing the pumping loss of the internal combustion engine, in a case where the revolution speed of the internal combustion engine is lower than the self-recovery revolution speed when the operation resumption request concerning the internal combustion engine is generated in the middle of the stop period provided by the automatic stop control.

2. The internal combustion engine according to claim 1, wherein the controller having the control logic further is configured to, when executed, control to place the waste-gate valve in the open position, the waste-gate valve having been previously placed in the closed position, when the internal combustion engine is to restart after the stop thereof.

3. The internal combustion engine according to claim 1, wherein:
the waste-gate valve includes an actuator for opening and closing the waste-gate valve; and
the controller controls the actuator to fully open the waste-gate valve in the case where the revolution speed of the internal combustion engine is equal to or higher than the self-recovery revolution speed, and controls the actuator to fully close the waste-gate valve in the case where the revolution speed of the internal combustion engine is lower than the self-recovery revolution speed.

4. The internal combustion engine according to claim 1, further comprising detection means for detecting a water temperature of the internal combustion engine; wherein the controller includes a memory storing self-recovery revolution speed characteristics which constitute information defining the self-recovery revolution speed with respect to the water temperature of the internal combustion engine; the controller has the control logic further configured to, when executed, acquire the self-recovery revolution speed based on the engine water temperature detected by the detection means, in accordance with the self-recovery revolution speed characteristics stored in the memory.

5. The internal combustion engine according to claim 1, wherein the controller having the control logic further is configured to, when executed:
  (i) compare the revolution speed of the internal combustion engine against the self-recovery revolution speed, and determine whether or not the operation resumption request concerning the internal combustion engine is generated, periodically; and
  (ii) terminate a periodic determination whether or not the operation resumption request is generated when the revolution speed of the internal combustion engine is found by the comparison to be lower than the self-recovery speed.

* * * * *